United States Patent
Fujisawa

(10) Patent No.: US 9,477,285 B2
(45) Date of Patent: Oct. 25, 2016

(54) DATA PROCESSING APPARATUS CAPABLE OF OPERATING IN POWER SAVING MODE, CONTROL METHOD OF DATA PROCESSING APPARATUS, AND STORAGE MEDIUM

(71) Applicant: CANON KABUSHIKI KAISHA, Tokyo (JP)

(72) Inventor: Minoru Fujisawa, Machida (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 268 days.

(21) Appl. No.: 13/926,232

(22) Filed: Jun. 25, 2013

(65) Prior Publication Data
US 2014/0006821 A1  Jan. 2, 2014

(30) Foreign Application Priority Data
Jun. 27, 2012 (JP) .................................. 2012-144548

(51) Int. Cl.
*G06F 1/32* (2006.01)

(52) U.S. Cl.
CPC .............. *G06F 1/32* (2013.01); *G06F 1/3209* (2013.01)

(58) Field of Classification Search
None
See application file for complete search history.

(56) References Cited

U.S. PATENT DOCUMENTS

| | | | |
|---|---|---|---|
| 2006/0218440 A1* | 9/2006 | Inoue ............................. 714/12 |
| 2011/0078464 A1* | 3/2011 | Yokomizo .................... 713/300 |
| 2011/0270924 A1* | 11/2011 | Johnsson et al. ............. 709/204 |
| 2012/0113462 A1* | 5/2012 | Mihira ................. G06F 3/1208 358/1.15 |

FOREIGN PATENT DOCUMENTS

JP  2008-301077 A  12/2008

\* cited by examiner

*Primary Examiner* — Kim Huynh
*Assistant Examiner* — Vincent Chang
(74) *Attorney, Agent, or Firm* — Carter, DeLuca, Farrell & Schmidt, LLP

(57) ABSTRACT

The present invention aims to easily maintain a state of less power consumption, by providing a data processing apparatus comprising: a registering unit to register therein data for identifying a packet; a receiving unit to receive a packet transmitted through a network; a determining unit to, in a case where the receiving unit receives the packet while the data processing apparatus is operating in a power saving mode, determine whether or not to return the data processing apparatus from the power saving mode, on the basis of the data registered in the registering unit; an analyzing unit to perform an analysis process to the packet flowing on the network; a displaying unit to display a screen indicating a result of the analysis process by the analyzing unit; and an indicating unit to indicate the data to be registered in the registering unit, through the screen displayed by the displaying unit.

8 Claims, 13 Drawing Sheets

FIG. 5

| PACKET TYPE | REQUEST TYPE | OID | INDEX | NUMBER OF TIMES OF REQUESTS |
|---|---|---|---|---|
| UNICAST | GetRequest | 1.3.6.1.2.1.25.3.2.1.5.1 | 0 | 34 |
| UNICAST | GetRequest | 1.3.6.1.2.1.25.3.5.1.1.1 | | 19 |
| BROADCAST | GetRequest | 1.3.6.1.2.1.1.2.0 | 7 | 16 |
| MULTICAST | GetRequest | 1.3.6.1.2.1.1.2.0 | 7 | 5 |
| UNICAST | SetRequest | 1.3.6.1.2.1.25.3.5.1.1.2 | | 2 |
| ⋮ | | | | |

FIG. 7

```
<?xml Version="1.0" encoding="utf-8"?>
   <D:pattetrn xmlns:D="S3:">
      <D:array>
                <D:port>161</D:port>                    ~701
                <D:protocol>snmp</D:protocol>           ~702
                <D:comm>0</D:comm>                      ~703
                <D:state>1</D:state>                    ~704
                <D:operation>0</D:operation>            ~705
                <D:overwrite>0</D:overwrite>            ~706
                <D:request>32</D:request>               ~707
                <D:scope>public</D:scope>               ~708
                <D:type>1.3.6.1.2.1.25.3.2.1.2.2</D:type> ~709
                <D:resval>0</D:resval>                  ~710
            <D:type>1.3.6.1.2.1.25.3.2.1.2.1</D:type>
                    <D:index0>1</D:index0>              ~711
      </D:array>
      <D:array>
         .
         .
         .
   </D:pattern>
```

FIG. 9

| DESTINATION PORT NUMBER | 161 | |
|---|---|---|
| PROTOCOL NAME | SNMP | |
| PATTERN SETTING ENABLED/DISABLED | 1 | |
| OPERATION TYPE | 0 | |
| PATTERN SETTING UPDATABLE/NON-UPDATABLE | 0 | |
| PACKET TYPE | 0 | |
| PATTERN[0] | REQUEST | 32 |
| | SCOPE | public |
| | TYPE | 1.3.6.1.2.1.25.3.2.1.2.2 |
| | resval | 0 |
| | TYPE | 1.3.6.1.2.1.25.3.2.1.2.1 |
| | index[0] | 1 |
| . | . | . |
| . | . | . |
| . | . | . |

PACKET DETAILS DISPLAY

| Ethernet II Frame: | DESTINATION MAC ADDRESS:<br>TRANSMISSION SOURCE MAC ADDRESS:<br>PACKET TYPE: | 88-87-17-0d-25-a1<br>00-0d-9d-d9-44-6f<br>IP |
|---|---|---|
| IP Frame: | VERSION:<br>HEADER LENGTH:<br>DSF:<br>TOTAL FRAME LENGTH:<br>ID:<br>FLAG:<br>FRAGMENT OFFSET:<br>TTL:<br>PROTOCOL:<br>CHECKSUM:<br>TRANSMISSION SOURCE IP ADDRESS:<br>DESTINATION IP ADDRESS: | 4<br>20<br>0<br>105<br>801<br>0<br>0<br>128<br>UDP<br>31841<br>192.168.45.21<br>192.168.10.128 |
| UDP Frame: | TRANSMISSION SOURCE PORT:<br>DESTINATION PORT:<br>FRAME LENGTH:<br>CHECKSUM | 1029<br>SNMP<br>85<br>14368 |
| SNMP Frame: | VERSION:<br>COMMUNITY:<br>REQUEST TYPE:<br>STATUS:<br>STATUS DETAILS:<br>NUMBER OF OID:<br>   OID:<br>   VALUE: | 1<br>public<br>Get-Request<br>0<br>0<br>3<br>1.3.6.1.2.1.25.3.2.1.5.1<br>NONE |

RETURN

DATA PROCESSING APPARATUS CAPABLE OF OPERATING IN POWER SAVING MODE, CONTROL METHOD OF DATA PROCESSING APPARATUS, AND STORAGE MEDIUM

BACKGROUND OF THE INVENTION

1. Field of the Invention

The present invention relates to a data processing apparatus, an information processing method, and a program for achieving the information processing method.

2. Description of the Related Art

Conventionally, an information processing system capable of transitioning to a power saving state so as to reduce standby power consumption has been known. As an example of the information processing system like this, there is a system which consists of a controller (main controller) having a main CPU (central processing unit) and a network controller having a sub CPU.

In the power saving state, the system like this stands by in a condition that power supply to each module of the main controller is being stopped while normal power supply to each module of the network controller requiring less power is being maintained. Further, in a case where a predetermined packet is received from a network, the system like this still reduces power consumption by using a so-called substitute response technique in which the network controller responds to the packet reception while stopping the power supply to the main controller.

In the conventional substitute response technique, when the network controller is in the power saving state, the network controller determines whether or not each packet received by the network controller itself coincides with a data pattern of an ARP (Address Resolution Protocol) request packet to the network controller. Further, in the power saving state, the network controller determines whether or not each packet received by the network controller itself coincides with a data pattern of a packet (i.e., a wake-up packet) which should be processed by the main controller after returning the main controller from the power saving state.

Then, when it is determined that the received packet coincides with the data pattern of the ARP request packet, the network controller transmits transmission data stored in a transmission data register to a LAN (local area network) as an ARP response packet (that is, a substitute response is performed). On the other hand, when it is determined that the received packet coincides with the data pattern of the wake-up packet, the network controller returns the main controller from the power saving state by outputting a wake-up signal to the main controller. It should be noted that the substitute response technique like this has been described in Japanese Patent Application Laid-Open No. 2008-301077.

In recent years, applications, operating systems and the like for remotely managing various devices by using management protocols such as an SNMP (Simple Network Management Protocol) and the like tend to increase. For this reason, since there are many possibilities that various devices receive various kinds of packets for each operational environment of a customer's device, it is difficult to anticipate the packet flowing for each operational environment of the customer's device.

As a result, even if a data pattern to be used for a substitute response or a wake-up has been previously registered in a device, a situation of returning the device from a power saving state without performing the substitute response may occur according to a customer's operational environment, by the reason that the substitute response is impossible. Moreover, since unnecessary coincidence between a received packet and a previously registered unnecessary data pattern is drawn according to circumstances, a situation of unnecessarily returning a device from a power saving state may occur.

It is conceivable as one countermeasure to previously register every possible data patterns. However, since parts of devices each including a network controller capable of operating in a power saving state operates on resources of minimized number in terms of power saving, there are limitations to register all the data patterns for each of these devices.

Moreover, it is conceivable as another countermeasure to enable to change the data pattern according to a kind of packet flowing on a network by a user's operation of registering and setting the data pattern through an external interface of the device such as a USB (universal serial bus), a network, a user interface screen or the like. However, in this case, since an operator (a user, an administrator or the like) of the device has to register the data patterns, an operator's workload increases resultingly.

SUMMARY OF THE INVENTION

The present invention has been completed in order to provide a technique for more easily maintaining a state of less power consumption.

To achieve such an object, the present invention provides a data processing apparatus comprising: a registering unit configured to register therein data for identifying a packet; a receiving unit configured to receive a packet transmitted through a network; a determining unit configured to, in a case where the receiving unit receives the packet while the data processing apparatus is operating in a power saving mode, determine whether or not to return the data processing apparatus from the power saving mode, on the basis of the data registered in the registering unit; an analyzing unit configured to perform an analysis process to the packet flowing on the network; a displaying unit configured to display a screen indicating a result of the analysis process by the analyzing unit; and an indicating unit configured to indicate the data to be registered in the registering unit, through the screen displayed by the displaying unit.

According to the present invention, it is possible to more easily maintain the state of less power consumption.

Moreover, the present invention may be achieved also by a method, a program, a system, a storage medium or the like.

Further features of the present invention will become apparent from the following description of exemplary embodiments with reference to the attached drawings.

BRIEF DESCRIPTION OF THE DRAWINGS

FIG. 5 is a diagram illustrating an example of a database table.

FIG. 7 is a diagram illustrating an example of pattern setting values.

FIG. 9 is a diagram illustrating an example of a pattern list.

FIG. 13 is a diagram illustrating a still another example of the user interface.

DESCRIPTION OF THE EMBODIMENTS

Hereinafter, exemplary embodiments of the present invention will be described with reference to the attached drawings. Incidentally, it should be noted that all constitutions and configurations described in the following embodiments are not necessarily indispensable as means for solving the above problems.

First Embodiment

The present embodiment relates to a technique for maintaining a power saving state in various apparatuses and devices. In the following, the present embodiment will be exemplarily described with reference to a multifunction machine 101 serving as an example of a data processing apparatus.

Figure 1:
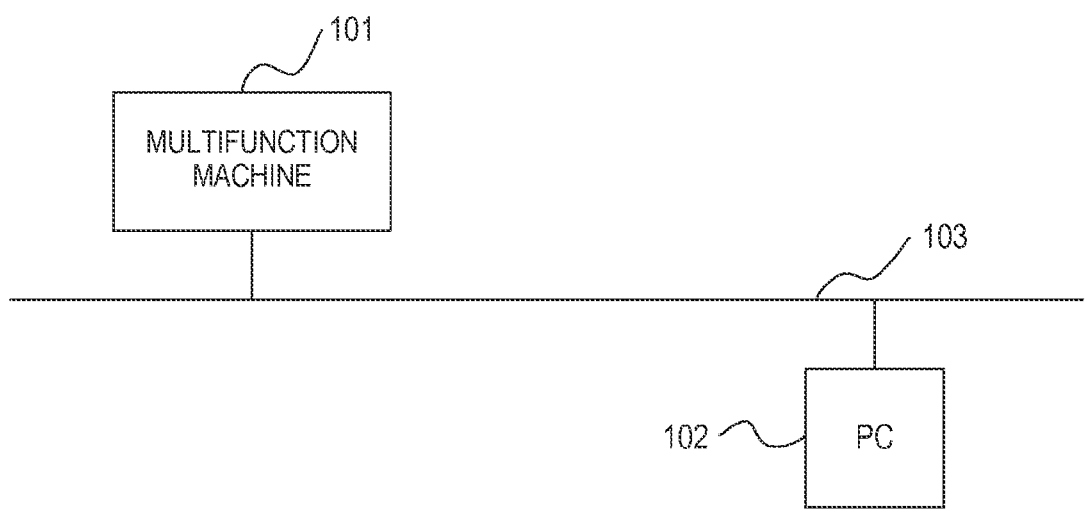
FIG. 1 is a block diagram illustrating an example of a network system.

FIG. 1 is a block diagram illustrating an example of the constitution of a network system including the multifunction machine 101. The multifunction machine 101 and a PC 102 are connected with each other through a network 103 and can be mutually communicated. Incidentally, it is not limited to the PC 102 to which the multifunction machine 101 is connected through the network 103.

Figure 2:
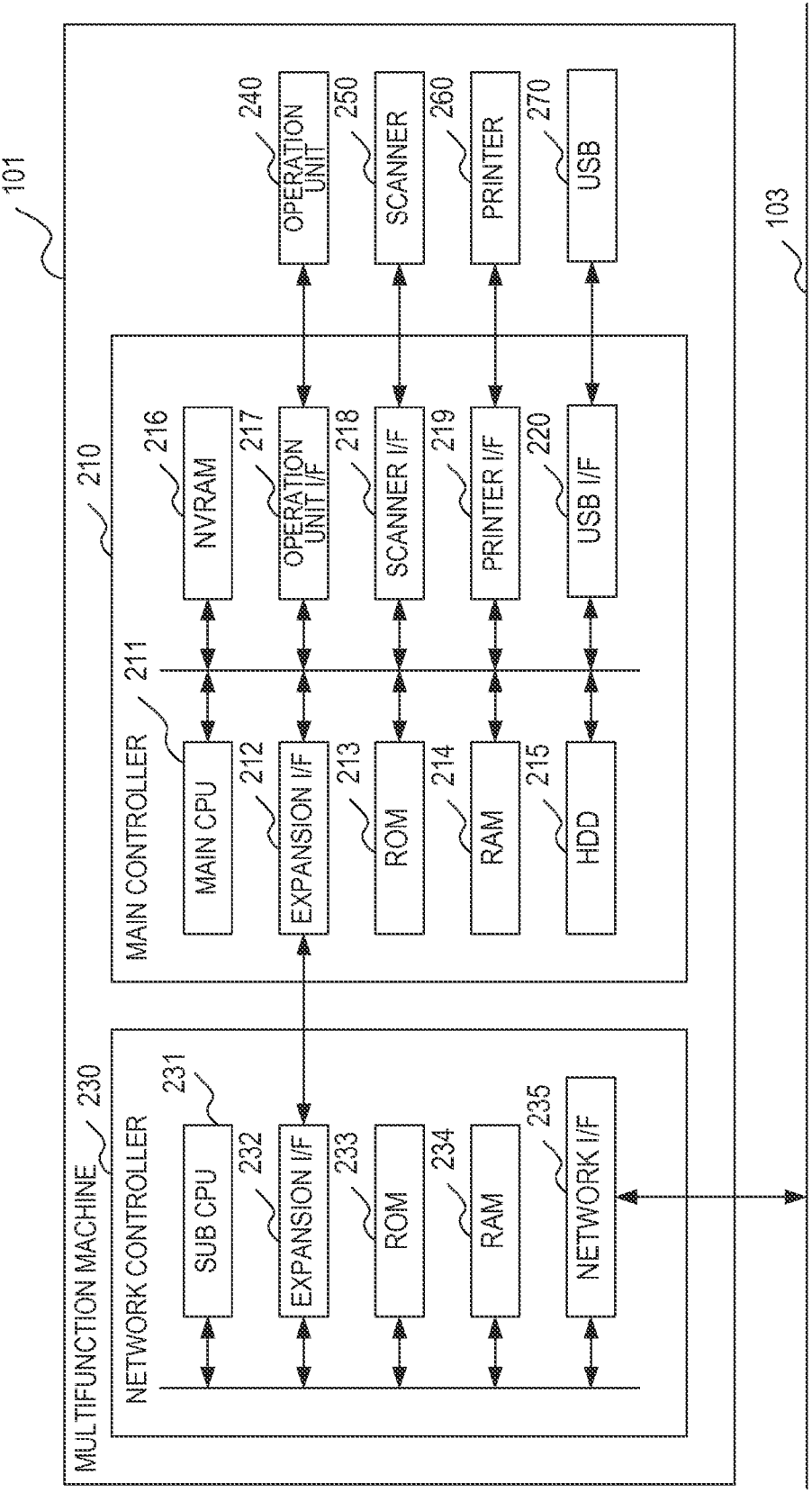
FIG. 2 is a block diagram illustrating an example of a hardware constitution of a multifunction machine.

FIG. 2 is a block diagram illustrating an example of the hardware constitution of the multifunction machine 101. The multifunction machine 101 has a main controller 210 and a network controller 230. The main controller 210 is connected with the network 103 through the network controller 230.

A main CPU 211 executes software programs of the main controller 210 and performs a control of the whole apparatus. A RAM 214, which is a random access memory, is used for temporarily storing data when the main CPU 211 controls the apparatus. A ROM 213, which is a read only memory, is used for storing a boot program of the apparatus, a fixed parameter and the like. An HDD 215, which is a hard disk drive, is used for storing various data. An NVRAM 216, which is a nonvolatile memory, stores various setting values of the main controller 210. Incidentally, the RAM 214, the HDD 215, the NVRAM 216 or the like is an example of a storage unit.

An operation unit I/F (interface) 217 controls an operation unit 240, makes a liquid crystal panel, which is an example of a display unit provided on the operation unit 240, display various operation screens and transfers instructions input through the operation screens to the main CPU 211. A scanner I/F 218 controls a scanner 250. The scanner 250 generates image data by reading an image on an original. A printer I/F 219 controls a printer 260. The printer 260 records an image based on the image data on a recording medium.

A USB I/F 220 controls a USB 270. The USB 270 identifies a nonvolatile USB memory to be inserted from an exterior and identifies a file, a directory and the like by controlling a file system in the USB memory cooperating with the USB I/F 220. An expansion I/F 212, which is connected with an expansion I/F 232 of the network controller 230, controls a data communication, which is performed with an external apparatus (PC 102 or the like) on the network 103, through the network controller 230.

A sub CPU 231 executes software programs of the network controller 230 and performs a control of the whole apparatus. A RAM 234, which is a random access memory, is used for temporarily storing data when the sub CPU 231 controls the apparatus. In addition, matching data or the like used for identifying a packet received from the network 103 is held in the RAM 234. A ROM 233, which is a read only memory, is used for storing a boot program of the apparatus, a fixed parameter and the like.

The expansion I/F 232, which is connected with the expansion I/F 212 of the main controller 210, controls a data communication performed between the main controller 210 and the network controller 230. A network I/F 235, which is connected with the network 103, controls a data communication performed between the multifunction machine 101 and an external apparatus (PC 102 or the like) on the network.

The main controller 210 operates by performing the switching between a normal power mode (an example of a first power mode) and a power saving mode (an example of a second power mode) of which the power consumption is less than that of the normal power mode. When transitioning to the power saving mode from the normal power mode, the power supply to the main CPU 211, the HDD 215, the NVRAM 216 and the like is stopped. On the other hand, the network controller 230 is operating with an ASIC (Application Specific Integrated Circuit), which is different from that in case of the main controller 210, and the power supply is continued even when transitioning to the power saving mode.

Figure 3:
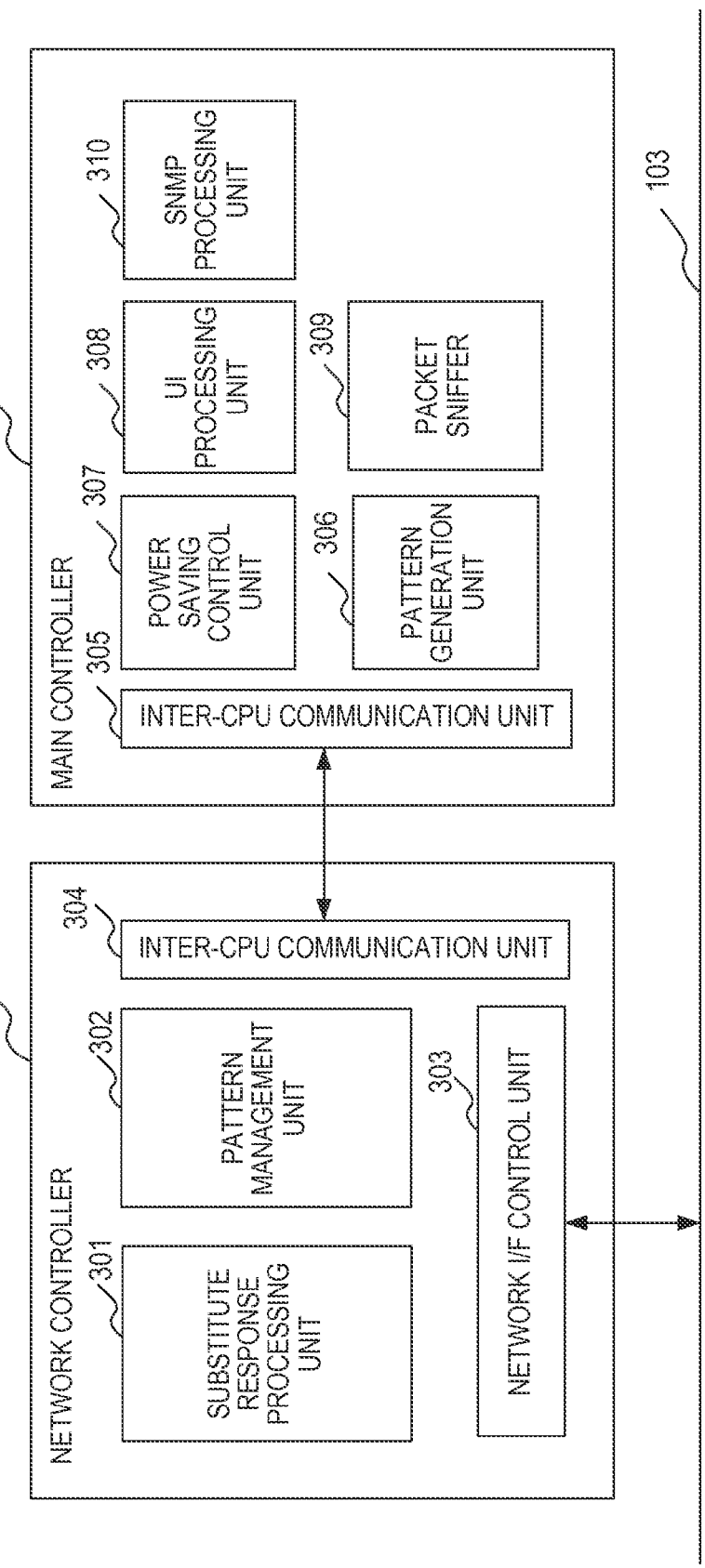
FIG. 3 is a block diagram illustrating an example of software (function part) of the multifunction machine.

FIG. 3 is a block diagram illustrating an example of the software (function part) constitution of the multifunction machine 101. Each of blocks illustrated in FIG. 3 indicates a function which is realized by a process that the software (program) is executed by a built-in controller unit in the multifunction machine 101.

A power saving control unit 307 performs a control concerned with the switching between the normal power mode and the power saving mode. An inter-CPU communication unit 305 performs the data transmission/reception with a function part of the network controller 230 through the expansion I/F 212 and the expansion I/F 232.

An inter-CPU communication unit 304 performs the data transmission/reception with a function part of the main controller 210 through the expansion I/F 232 and the expansion I/F 212. A network I/F control unit 303 controls the transmission/reception of a packet performed by the network I/F 235.

Incidentally, the network I/F control unit 303 grasps a fact that the main controller 210 is operated with which the power mode either the normal power mode or the power saving mode. When the main controller 210 is operated with the normal power mode, the network I/F control unit 303 transfers packets to be received from the network 103 to the main controller 210. When the main controller 210 is operated with the power saving mode, the network I/F control unit 303 transfers the packets to be received from the network 103 to a substitute response processing unit 301.

The substitute response processing unit 301 receives the packets transferred from the network I/F control unit 303 at the time of the power saving mode. Note that the substitute response processing unit 301 receives the packets in a case that the main controller 210 is operating with the power saving mode. When it is the normal power mode, the packets received by the network I/F control unit 303 are not transferred to the substitute response processing unit 301 but transferred to the main controller 210.

The substitute response processing unit 301 classifies the packets, which were received at the time of the power saving mode, into three types of packets. More specifically, the substitute response processing unit 301 classifies the packets into "packet which should be discarded", "packet which should be transferred to the main controller 210" and "packet which should perform a substitute response".

The "packet which should be discarded" is such a packet which can be ignored (it is not required to respond) in such a case, where the packet is not addressed to the own apparatus. The substitute response processing unit 301 discards the packet in a case that the received packet is classified into this type of packet.

The "packet which should be transferred to the main controller 210" is such a packet characterized in that some process is required to be performed to the received packet but the required process is not able to be performed by only the network controller 230. The substitute response processing unit 301 returns the main controller 210 from the power saving mode to the normal power mode in a case that the received packet is classified into this type of packet and transfers this packet to the main controller 210.

The "packet to which a substitute response should be performed" is such a packet characterized in that the network controller 230 performs a response instead of the main controller 210. The substitute response processing unit 301 generates a packet used for the response (a response packet) of this packet in a case that the received packet is classified into this type of packet and performs a response to a requesting source (a transmission source of the concerned packet) of this response packet on the network 103 through the network I/F control unit 303.

A UI (User Interface) processing unit 308 receives a setting request, a processing request and the like to be input through the operation unit 240, which is an example of an external interface, and then executes a necessary process every request. In addition, the UI processing unit 308 performs plural kinds of requests such as a request of asking to start and stop the acquisition of packets, a request of demanding the packets obtained by a packet sniffer 309 and other requests to the packet sniffer 309. Note that more detailed contents will be described in the second embodiment.

When the main controller 210 is in the normal power mode, the packet sniffer 309 obtains packets which are flowing on the network 103 and stores the obtained packets into the HDD 215. The packet sniffer 309 performs a corresponding process upon receiving a request from the UI processing unit 308. Note that more detailed contents will be described in the second embodiment.

When the main controller 210 is in the normal power mode, an SNMP (Simple Network Management Protocol) processing unit 310 receives a packet of SNMP (SNMP packet) from the PC 102 and analyzes the received packet and then generates a response packet. The SNMP processing unit 310 can obtain various kinds of information, which the main controller 210 manages, and generates the response packet by using the obtained information (a response packet generation process).

In addition, after receiving a command from the UI processing unit 308, the SNMP processing unit 310 manages the number of requesting the response packets, which is performed by the PC 102, every the response packet from among the SNMP packets, to which the SNMP processing unit 310 itself performed the response packet generation process, transferred from the PC 102. The SNMP processing unit 310 generates a pattern setting value based on the SNMP packet transferred from the PC 102 by preferentially treating the request, of which the requesting number is larger, and transfers the generated pattern setting value to a pattern generation unit 306.

The pattern generation unit 306 generates a pattern list which includes data used for a process, which the substitute response processing unit 301 performs, by using the pattern setting value transferred from the SNMP processing unit 310. In addition, the pattern generation unit 306 transfers the generated pattern list to a pattern management unit 302 via the inter-CPU communication unit 305 and the inter-CPU communication unit 304. Furthermore, the pattern generation unit 306 stores the generated (transferred) pattern list into the HDD 215 and manages the pattern list. The pattern management unit 302 stores the pattern list into the RAM 234 and manages the pattern list. The pattern list is constituted by including pattern information which includes matching data and the like.

The substitute response processing unit 301 performs a pattern matching process to the packet received from a remote (PC 102 or the like) through the network I/F control unit 303 by using the pattern list obtained from the pattern management unit 302. The substitute response processing unit 301 determines that a packet corresponds to which of the packet among the "packet which should be discarded", the "packet which should be transferred to the main controller 210" and the "packet to which a substitute response should be performed" in the pattern matching process and then performs respective operations.

For example, when the "packet to which a substitute response should be performed" was determined, the substitute response processing unit 301 generates a response packet (response data) by using information in the received packet and data used for the substitute response included in pattern information (refer to FIG. 9) corresponding to the concerned packet. The substitute response processing unit 301 transmits (responds) the generated response packet to a requesting source of the response packet while keeping the power saving mode.

Figure 4:
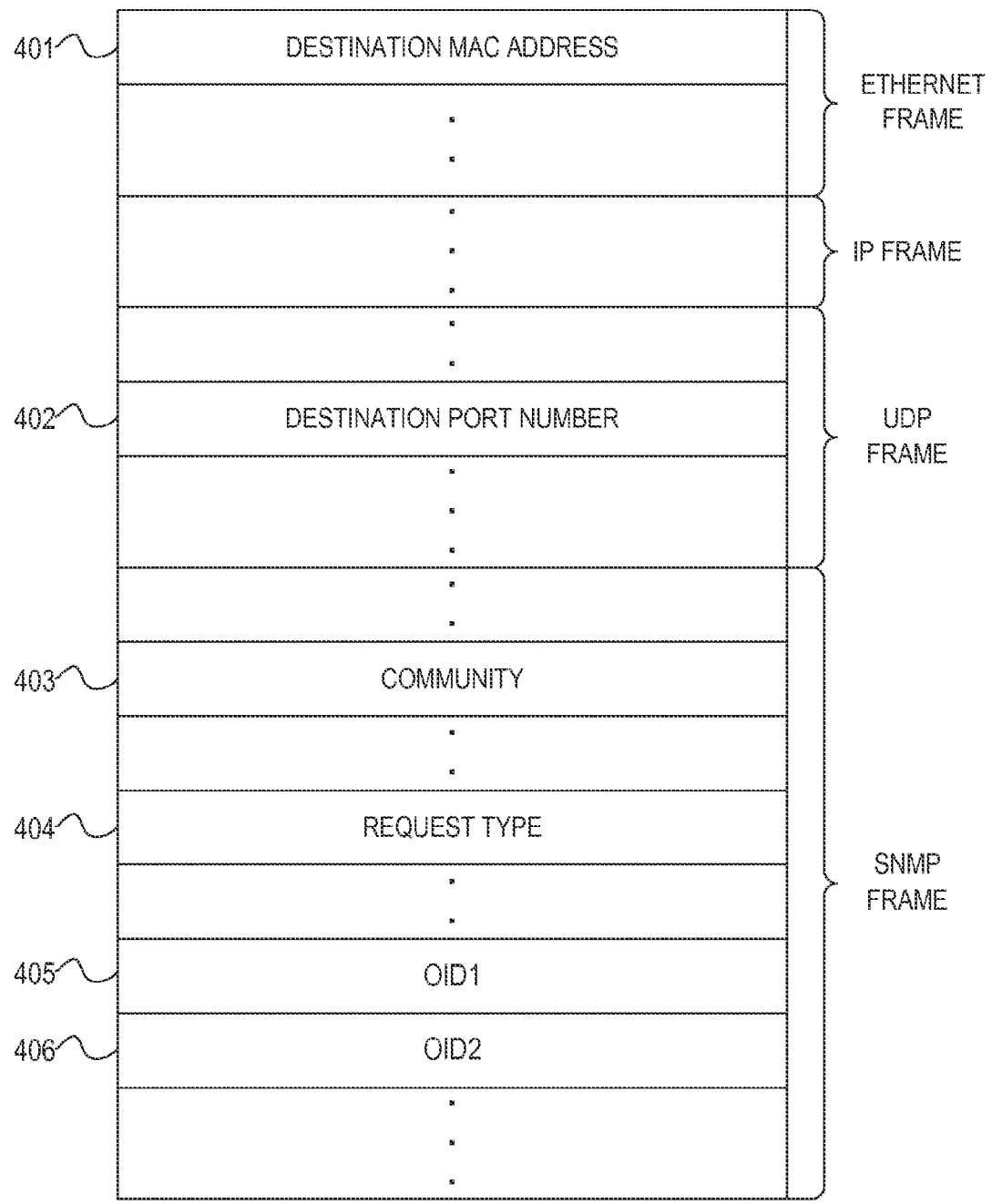
FIG. 4 is a diagram illustrating an example of an SNMP (Simple Network Management Protocol) packet.

FIG. 4 is a diagram illustrating an example of an SNMP packet, which the multifunction machine 101 received from the PC 102. When the main controller 210 is in the normal power mode, the SNMP processing unit 310 analyzes the SNMP packet and performs various processes for the SNMP packets transferred from the PC 102. In the SNMP, as illustrated in FIG. 4, the packet is constituted by four large frames which are an Ethernet (registered trademark) frame, an IP frame, a UDP (User Datagram Protocol) frame and an SNMP frame.

When a pattern setting value is generated from the received SNMP packet, the SNMP processing unit 310 does not require information of each field in the frame of the SNMP packet, that is, information of all the regions in the packet. Information of a region required in generating the pattern setting value is previously determined every network protocol, and information of the concerned region is used in a pattern matching process.

Hereinafter, it will be described by exemplifying information of a region required in case of generating the pattern setting value from the SNMP packet (properly called a packet).

A destination MAC (Media Access Control) address 401 denotes a MAC address of the destination of a packet. In the present example, since the PC 102 becomes to act as a transmission source and the destination becomes to be the multifunction machine 101, a MAC address held by the multifunction machine 101 is included in this region. A destination port number 402 denotes a port number of the destination of SNMP. Generally, a value of a port number of the destination of SNMP is defined as "161" by the RFC (Request For Comment). Also in the present example, a value of the destination port number 402 is "161".

A Community 403 denotes a community name in the SNMP. Generally, in the SNMP, a process and a response are performed to a packet received from an apparatus of the same community, and a packet received from an apparatus of different community is discarded.

A Request type 404 denotes a Request type (GetRequest or the like) of the packet. An OID 405 and an OID 406 denote OIDs (Object IDs) in the SNMP. An apparatus which received an SNMP packet generally processes information corresponding to the OID in the received SNMP packet and performs a response.

The SNMP processing unit 310 receives the SNMP packet and creates a response packet and then performs a process, and, at the same time, the SNMP processing unit 310 generates a database table, which includes information of the destination MAC address 401, the Request type 404, the OID 405 and the OID 406 and then manages the database table. Note that more detailed contents will be described with reference to FIG. 5 and FIG. 6. Meanwhile, the destination MAC address 401, the destination port number 402, the Community 403, the Request type 404, the OID 405 and the OID 406 are examples of prescribed items which were previously determined.

FIG. 5 is a diagram illustrating an example of a database table, which the SNMP processing unit 310 generates and manages. A packet type 501 denotes a type of the received packet. The type of packet mentioned here indicates either packet among unicast, broadcast and multicast. Generally, as to a fact of being either packet among the unicast, broadcast and multicast, it can be discriminated from a fact that values of the destination MAC address 401 are respectively different.

A Request type 502 denotes a type of Request (Request type) of the received packet. Generally, as the Request type of the SNMP, GetRequest, GetNext, SetRequest and the like are enumerated. Generally, GetNext is a method (Request) for obtaining a next OID for the OID requested by the GetRequest, and the processing content is the same as that of GetRequest. Therefore, the GetNext is treated as the same Request type as that of the GetRequest.

An OID 503 denotes an OID included in the received packet. An Index 504 denotes an index of the OID 503. In the SNMP, generally, there is a case that an index, which is used for indicating the details of information, is assigned to setting information and management information which are assigned to the OID. As to a case of existing plural detailed information corresponding to the OID 503, the Index 504 denotes an index of the plural detailed information. The number of times of Request 505 denotes the number of times (an example of number information) in receiving the same packet regarding the packet type 501, the Request type 502 and the OID 503 (further Index 504 in a case existing the Index 504).

Figure 6:
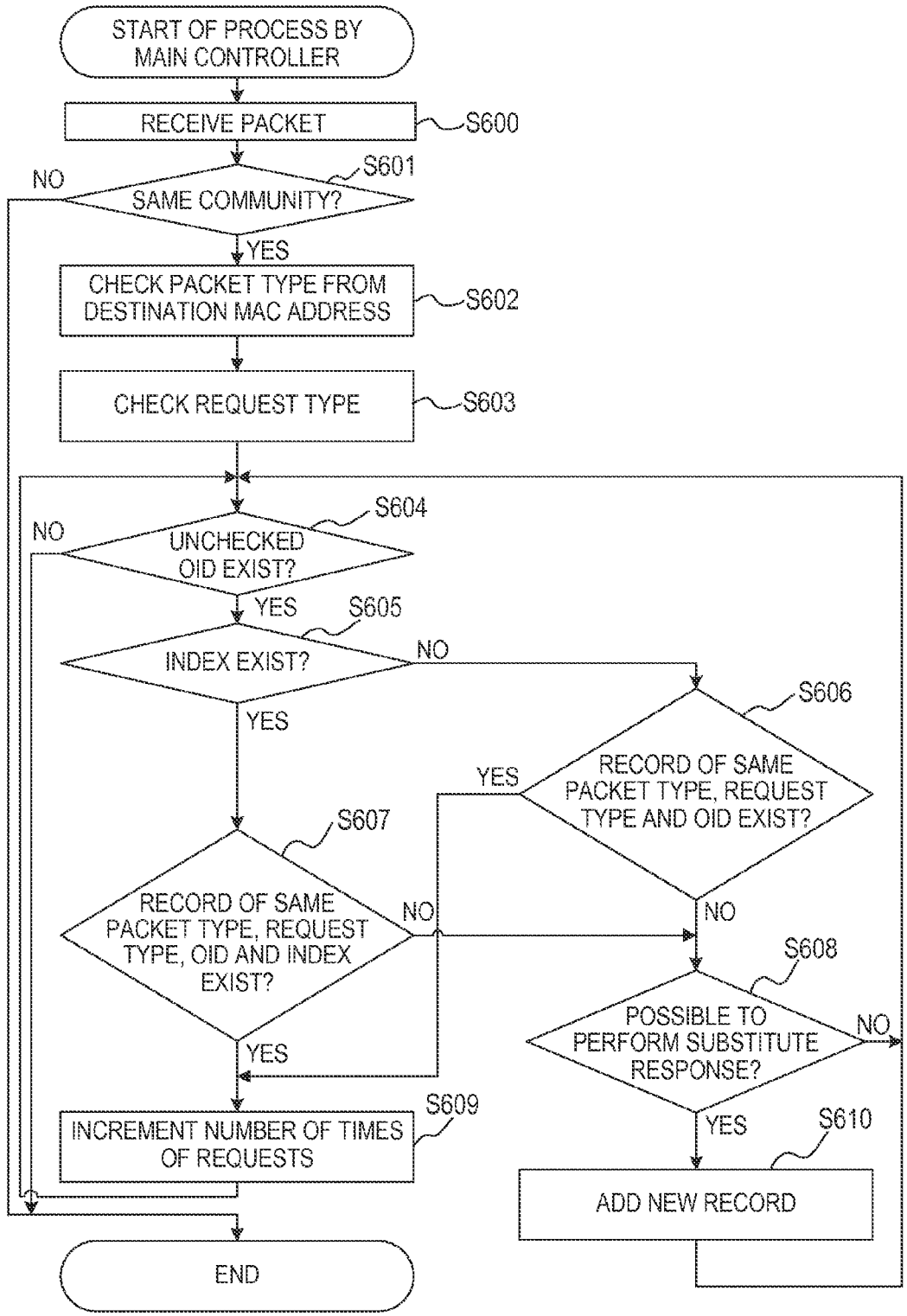
FIG. 6 is a flow chart indicating an example of a database table management process.

FIG. 6 is a diagram indicating an example of a flow chart concerning a process of managing a database table (database table management process). The main CPU 211 (SNMP processing unit 310) manages the database table as described below.

The main CPU 211 receives a packet from the PC 102 through the expansion I/F 212 or the like (Step S600). The main CPU 211 confirms (checks) whether or not a community name of the Community 403 of the received packet is identical with a community name held in the NVRAM 216 or the like in a step S601. When it was judged that the community names are not identical with each other, the main CPU 211 terminates a process to the database table for the received packet. On the other hand, when it was judged that the community names are identical with each other, the main CPU 211 advances a process to a step S602.

In the step S602, the main CPU 211 confirms that a type of the concerned packet is what type of a packet among the unicast, broadcast and multicast with reference to the destination MAC address 401 of the received packet.

In a step S603, the main CPU 211 confirms the Request type of the concerned packet with reference to the Request type 404 of the received packet. In a step S604, the main CPU 211 confirms whether or not an unchecked OID exists from one or plural OIDs (OID 405, OID 406 and the like) included in the received packet. When it was judged that the unchecked OID exists, the main CPU 211 advances a process to a step S605. On the other hand, when it was judged that the unchecked OID does not exist, the main CPU 211 terminates a process to the database table for the received packet by treating that checks for all the OIDs are completed.

In the step S605, the main CPU 211 confirms whether or not an Index of the OID targeted to be performed a check exists in the packet. When it was judged that the Index exists, the main CPU 211 advances a process to a step S607. On the other hand, when it was judged that the Index does not exist, the main CPU 211 advances the process to a step S606.

In a step S607, the main CPU 211 confirms whether or not a record of the same confirmed packet type, Request type, OID and Index exists in the database table. When it was judged that a record of the same information exists, the main CPU 211 advances a process to a step S609. On the other hand, when it was judged that a record of the same information does not exist, the main CPU 211 advances a process to a step S608. In the step S609, the main CPU 211 increments the number of times of Request 505 in the record of the same information and advances a process to the step S604.

In the step S608, the main CPU 211 confirms whether or not a substitute response can be performed to information, which corresponds to the OID (OID and Index when Index exists) targeted to be performed a check, by the network controller 230 in a state of the power saving mode. When it was judged that the substitute response can be performed, the main CPU 211 advances a process to a step S610. On the other hand, when it was judged that the substitute response cannot be performed, the main CPU 211 advances a process to the step S604.

Here, it will be described about information which is currently managed by the main controller 210. Information which is dynamically updated by using the main controller 210 and information which is changing in real time such as various setting values used for operating the main controller itself, residual quantity of sheets and the like are included in the information which is currently managed by the main controller 210. In addition, information such as specification, a consumption degree, condition, error and the like which can be obtained from parts such as the printer 260, the scanner 250 and the like are also included in the information which is currently managed by the main controller 210.

In case of receiving a packet which prompts to return from the power saving mode or in a case that information at a time when the packet was received is required to return to the PC 102, it is required to return to the normal power mode from the power saving mode and execute a process to the packet received by the SNMP processing unit 310. Therefore, in the present embodiment, the main CPU 211 confirms whether or not a substitute response can be performed to information (a fixed setting value or the like), to which, for example, the substitute response can be performed, with reference to the NVRAM 216, in which identifiable information (OID, OID and Index thereof or the like) is previously stored.

Here, the database table is used for maintaining the power saving mode for a longer period under the network environment where the multifunction machine 101 is located. Therefore, the main CPU 211 does not perform management at the database table to a packet which is in a case that "it is indispensable to be returned from the power saving mode". As to a pattern setting value to be generated, it will be described with reference to FIG. 7.

In the step S610, the SNMP processing unit 310 adds information of the confirmed packet type, Request type, OID and Index to the database table as a record and sets a value "1" for the number of times of Request 505.

In the step S606, the main CPU 211 confirms whether or not a record of the same confirmed packet type, Request type and OID exists in the database table. When it was judged that a record of the same information exists, the main CPU 211 advances a process to the step S609. On the other hand, when it was judged that a record of the same information does not exist, the main CPU 211 advances a process to the step S608.

FIG. 7 is a diagram illustrating an example of pattern setting values. The pattern setting values are constituted by including matching data (an example of identification information) used for identifying the received packet and processing data (an example of processing information) which defined that what process should be performed in a case that the received packet coincided with the matching data. Incidentally, in a matching process, pattern information matches with the concerned packet is specified on the basis of data in the received packet and the matching data.

The SNMP processing unit 310 generates the pattern setting values before the main controller 210 transitions to the power saving mode and transmits the values to the pattern generation unit 306. The SNMP processing unit 310 uses the database table generated and managed in the process in a flow chart illustrated in FIG. 6 and generates the pattern setting values preferentially selecting from a record of which the number of times of Request 505 is the largest number. For example, in a case that information of OID can be included in the pattern setting values up to a specified value (for example, ten pieces) according to the restriction of capacity, the SNMP processing unit 310 performs to include information of ten pieces of higher ranks OIDs, of which the number of times of Request 505 is larger number, into the pattern setting values.

Destination port number information 701 denotes a value of the destination port number 402 of the packet which was received at a time of the power saving mode. The value of the destination port number 402, which is a previously defined value as mentioned above, is stored in the HDD 215, the NVRAM 216 or the like. The SNMP processing unit 310 sets the value (previously defined value) of the destination port number 402 to the destination port number information 701. The destination port number information 701 is formed into pattern information through the pattern generation unit 306 to be transferred to the substitute response processing unit 301. Accordingly, in the power saving mode, the substitute response processing unit 301 compares a destination port number of the received packet with a destination port number of certain pattern information and can judge whether or not the concerned packet matches with that pattern information.

Protocol name information 702 denotes a protocol name of the packet which was received at a time of the power saving mode. Generally, as to a network protocol, a protocol, which is corresponded by the destination port number information 701, can be determined. Therefore, if either information among the destination port number information 701 and the protocol name information 702 is set, it may be regarded that the setting value is an effective value.

Packet type information 703 denotes a packet type of the received packet. The SNMP processing unit 310 sets a value of the packet type 501 to the packet type information 703.

Pattern setting enabled/disabled information 704 denotes the enabled/disabled of pattern setting values. In a case that information indicating effectiveness of the pattern setting value is set to the pattern information on the basis of the pattern setting enabled/disabled information 704, the substitute response processing unit 301 is to perform a matching process of that pattern information to the packet which was received at a time of the power saving mode. In a case that information indicating ineffectiveness of the pattern setting value is set to the pattern information on the basis of the pattern setting enabled/disabled information 704, the substitute response processing unit 301 does not perform the matching process of that pattern information to the packet which was received at a time of the power saving mode.

As to the pattern setting enabled/disabled information 704, the SNMP processing unit 310 basically sets it to the pattern information by treating it as effective information (information "1" indicating effectiveness).

Operation type information 705, which is an example of processing information, indicates a type of a subsequent operation in a case that the received packet matched with the pattern information. Information (for example, "1") indicating "discard a reception packet" can be set to the operation type information 705. Also, information (for example, "2") indicating "transfer a reception packet to the main controller 210 and return from the power saving mode" can be set to the operation type information 705. Also, information (for example, "0") indicating "perform a process of response of a packet received by the network controller 230 and transmit the processed response on behalf of the main controller 210 while maintaining the power saving mode" can be set to the operation type information 705.

In the present embodiment, a record of the packet, to which the substitute response can be performed in a process indicated in FIG. 6, is stored, and a pattern setting value characterized in that "0" indicating the substitute response was set to the operation type information 705 is generated on the basis of that record. Then, when that pattern setting value is formed into pattern information through the pattern generation unit 306, since the substitute response is to be performed, the power saving mode is to be maintained for a longer period.

Pattern setting value updatable/non-updatable information 706 indicates the updatable/non-updatable (update is permitted or not) of the pattern information generated based on the pattern setting value. The pattern setting value updatable/non-updatable information 706 becomes to be required in a case that amount of the pattern information held by the network controller 230 became the maximum on the resource of the network controller 230. As to the pattern setting value updatable/non-updatable information 706, in a case that amount of the pattern information held by the network controller 230 becomes the maximum, the pattern setting value updatable/non-updatable information 706 of the registered pattern information, which is in a state of "overwritable", is used for overwriting with new pattern information subsequently.

In addition, as to the pattern setting value updatable/non-updatable information 706, it is possible to set to delete the pattern information. By setting a process of deletion, it is possible to delete and disable the pattern information which was unable to be overwritten formerly. In the present embodiment, the SNMP processing unit 310 sets "0" indicating prohibition of the update to the pattern setting value updatable/non-updatable information 706.

Request type information 707 denotes a Request type (GetRequest or the like) of the received packet. The SNMP processing unit 310 sets a value of the Request type 502 to the Request type information 707. The Request type information 707 is formed into the pattern information through the pattern generation unit 306 to be transferred to the substitute response processing unit 301. Accordingly, in the power saving mode, the substitute response processing unit 301 compares a Request type of the received packet with a Request type of certain pattern information and can judge whether or not the concerned packet matches with that pattern information.

Community information 708 denotes a Community name of the received packet. The SNMP processing unit 310 sets a value of the Community 403 (Community name held in the HDD 215, the NVRAM 216 or the like) to the Community information 708. The Community information 708 is formed into the pattern information through the pattern generation unit 306 to be transferred to the substitute response processing unit 301. Accordingly, in the power saving mode, the substitute response processing unit 301 compares a Community name of the received packet with a Community name of certain pattern information and can judge whether or not the concerned packet matches with that pattern information.

OID information 709 denotes an OID of the received packet. The SNMP processing unit 310 sets a value of the OID 503 to the OID information 709. Correspondence information 710 denotes information which corresponds to the OID information 709. Index information 711 denotes information which corresponds to an Index value of the OID. The SNMP processing unit 310 sets a value of the Index 504 to the Index information 711.

Information, which corresponds to the OID (or OID and Index), is included in the correspondence information 710 and the Index information 711 among various kinds of information currently managed by the main controller 210. Incidentally, information which is dynamically updated by using the main controller 210 such as various setting values used for operating the main controller itself, residual quantity of sheets and the like are included in the various kinds of information currently managed by the main controller 210. In addition, information such as specification, a consumption degree, condition, error and the like which can be obtained from parts such as the printer 260, the scanner 250 and the like are also included in the information which is currently managed by the main controller 210.

The OID information 709 and the correspondence information 710 are formed into pattern information through the pattern generation unit 306 to be transferred to the substitute response processing unit 301. In the power saving mode, the substitute response processing unit 301 compares an OID of the received packet with an OID of certain pattern information and can judge whether or not the concerned packet matches with that pattern information. In addition, an OID and the Index information 711 of this OID are formed into pattern information through the pattern generation unit 306 to be transferred to the substitute response processing unit 301. In the saving mode, the substitute response processing unit 301 compares the OID and Index of the received packet with the OID and Index of certain pattern information and can judge whether or not the concerned packet matches with that pattern information.

As mentioned above, the SNMP processing unit 310 generates pattern setting values and transfers the generated values to the pattern generation unit 306. Incidentally, the destination port number information 701 (protocol name information 702), the packet type information 703, the Request type information 707 and the Community information 708 are examples of identification information for identifying the type of packets. In addition, the pattern setting value is an example of setting information formed by associating processing information with identification information.

Figure 8:
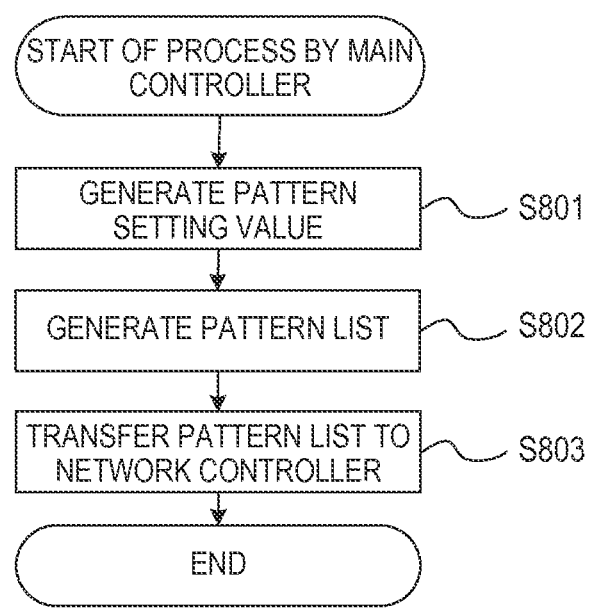
FIG. 8 is a flow chart indicating an example of a pattern list generation process.

FIG. 8 is a diagram indicating an example of a flow chart related to a process (pattern list generation process), which the pattern generation unit 306 performs in a case that the SNMP processing unit 310 generated pattern setting values as indicated in FIG. 7 and transferred the generated values to the pattern generation unit 306.

In a step S801, the main CPU 211 generates the pattern setting values on the basis of a database table. In a step S802, the main CPU 211 analyzes the pattern setting values and generates a pattern list (refer to FIG. 9). In a step S803, the main CPU 211 transfers the generated pattern list to the network controller 230 by a method of inter-CPU communication.

FIG. 9 is a diagram illustrating an example of a pattern list (pattern information 901) generated by the pattern generation unit 306. The pattern information 901 is an example of a pattern list, which the pattern generation unit 306 generates on the basis of the pattern setting values indicated in FIG. 7. Incidentally, the pattern list (pattern information) is an example of the setting information formed by associating processing information with identification information.

Figure 10:
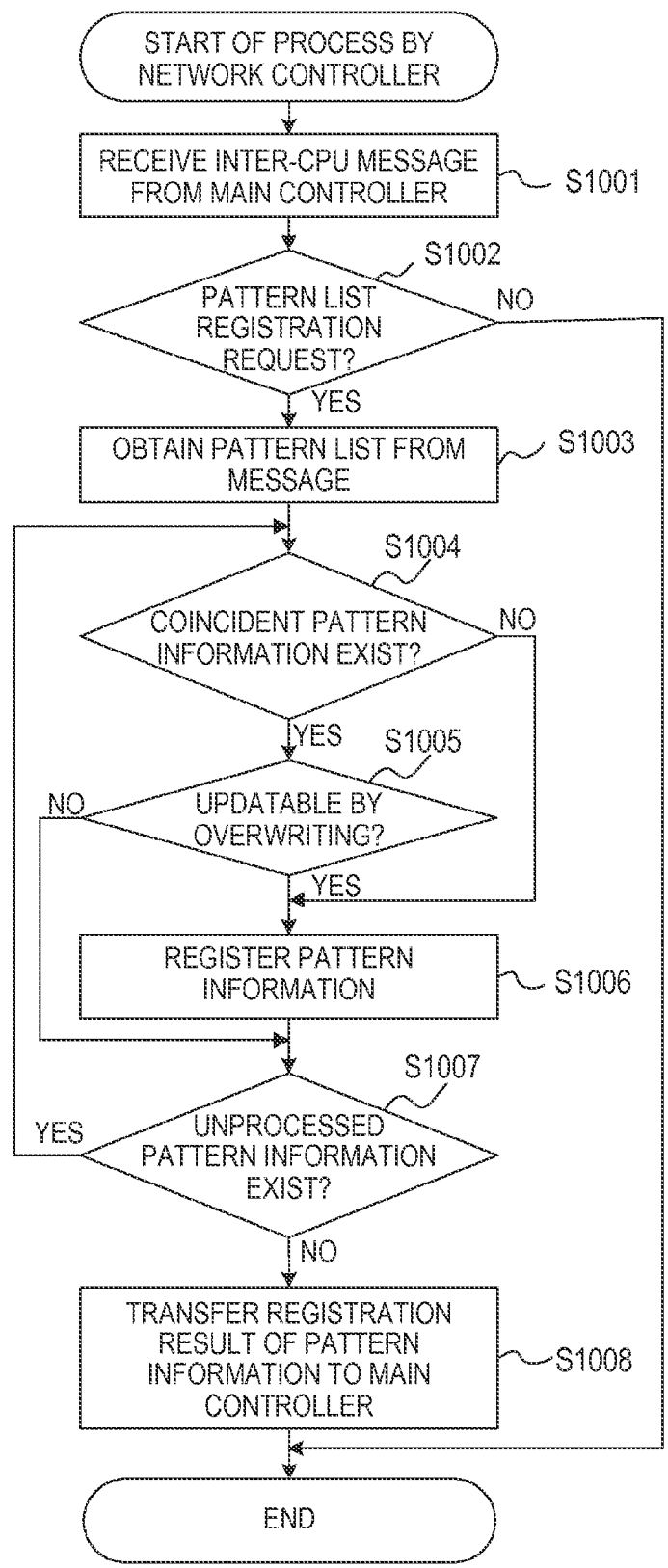
FIG. 10 is a flow chart indicating an example of a pattern information registration process.

FIG. 10 is a diagram indicating an example of a flow chart related to a process (pattern information registration process), which the network controller 230 performs in a case that the pattern list was transferred to the network controller 230 by a process in the step S803.

In a step S1001, the sub CPU 231 receives an inter-CPU message (a pattern list or the like transferred from the network controller 230 in the step S803) by a method of inter-CPU communication. In a step S1002, the sub CPU 231 confirms whether or not the received inter-CPU message is a message of registering the pattern list (registration request). When it was judged that it was not the registration request, the sub CPU 231 terminates a process. On the other hand, when it was judged that it was the registration request, the sub CPU 231 advances the process to a step S1003.

In the step S1003, the sub CPU 231 obtains a pattern list from the inter-CPU message received in the step S1001. In a step S1004, the sub CPU 231 obtains one of the pattern information from the pattern list and confirms whether or not pattern information, which coincides with the obtained one information, exists in the pattern list held in the RAM 234.

Here, as to a fact of coinciding or not coinciding with the obtained one information, it is judged based on information of, for example, a destination port number (and/or protocol name) of the pattern information, packet type, Request, scope and type (type and Index when Index exists).

When it was judged that pattern information, which coincides with the obtained one information, does not exist, the sub CPU 231 advances a process to a step S1006. On the other hand, when it was judged that pattern information, which coincides with the obtained one information, exists, the sub CPU 231 advances the process to a step S1005.

In a step S1005, the sub CPU 231 checks whether or not the pattern setting value updatable/non-updatable information of the coincided pattern information in the pattern list held in the RAM 234 can be updated. That is, it is checked whether an attribute of the "pattern setting value updatable/non-updatable" is "1" or "0". When it was judged that it is non-updatable (that is, attribute of the "pattern setting value updatable/non-updatable" is "0"), the sub CPU 231 advances a process to a step S1007. On the other hand, when it was judged that it is updatable (that is, attribute of the "pattern setting value updatable/non-updatable" is "1"), the sub CPU 231 advances the process to the step S1006.

In the step S1006, the sub CPU 231 registers one of the pattern information, which was obtained in the step S1004, to the pattern list held in the RAM 234. In case of performing the overwriting registration, it is performed to the coincided pattern information.

In the step S1007, the sub CPU 231 confirms whether or not pattern information (unprocessed pattern information) other than the pattern information obtained in the step S1004 exists in the pattern list obtained in the step S1003. When it was judged that the unprocessed pattern information exists, the sub CPU 231 repeats processes subsequent to the step S1004 to the unprocessed pattern information. On the other hand, when it was judged that the unprocessed pattern information does not exist, the sub CPU 231 advances the process to a step S1008. In the step S1008, the sub CPU 231 transfers the registered result of the pattern information (pattern list) to the main controller 210 by a method of inter-CPU communication.

According to the above-mentioned process, when the main controller 210 received a packet from the PC 102 in the power saving mode, the substitute response processing unit 301 specifies the pattern information by executing a pattern matching process by use of the pattern list, and it becomes possible to confirm whether or not the substitute response can be performed. In a case that the substitute response can be performed, the substitute response processing unit 301 generates a response packet of the received packet by using the pattern information and performs a response to the PC 102. In a case that the substitute response cannot be performed, the substitute response processing unit 301 discards the received packet or returns the main controller 210 from the power saving mode and transfers the packet to the main controller 210. As to determination which the process should be performed among these processes, it is determined based on a value of the operation type of the pattern information.

Figure 11:
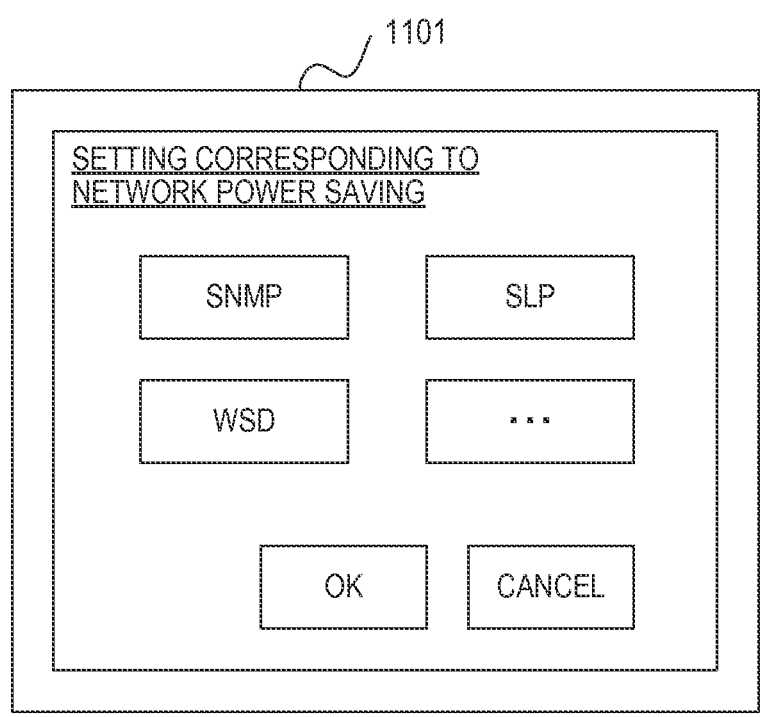
FIG. 11 is a diagram illustrating an example of a user interface.

FIG. 11 is a diagram illustrating an example (a setting screen 1101, which is displayed on the operation unit 240, for setting a type of network protocol of performing a substitute response in the power saving mode) of a user interface. The setting screen 1101 has such the constitution, where it is selected that the substitute response should be performed when the packet is for what kind of the network protocol in a case that the packet was received from the PC 102 when the main controller 210 is in the power saving mode.

When the SNMP is selected on the setting screen 1101, the UI processing unit 308 requests to generate a pattern setting value (generation request) of the substitute response to the SNMP processing unit 310. When the generation request of the pattern setting value is received, the SNMP processing unit 310 generates a database table by the above-mentioned method and manages the table and then generates the pattern setting value. Then, the SNMP processing unit 310 transfers the pattern list (pattern information) to the network controller 230 through the pattern generation unit 306 before the main controller 210 transitions to the power saving mode.

In the present embodiment, although it has been described exemplifying the SNMP, it is possible to provide the mechanism of performing the substitute response to a packet of the protocol such as a SLP Service Location Protocol), a WSD or the like by the similar method. In addition, plural network protocols can be simultaneously selected on the setting screen 1101.

According to the above-mentioned constitution, the load of registration operation of the pattern information performed by an operator can be reduced.

Second Embodiment

In the present embodiment, as a registration method of the pattern information different from that of the first embodiment, a method that the packets received by the packet sniffer 309 from the network 103 are stored into the HDD 215 and the stored packets are utilized in registering the pattern information will be described. In the present embodiment, as to the same constitution as that of the first embodiment, the description thereof will be properly omitted.

Figure 12:
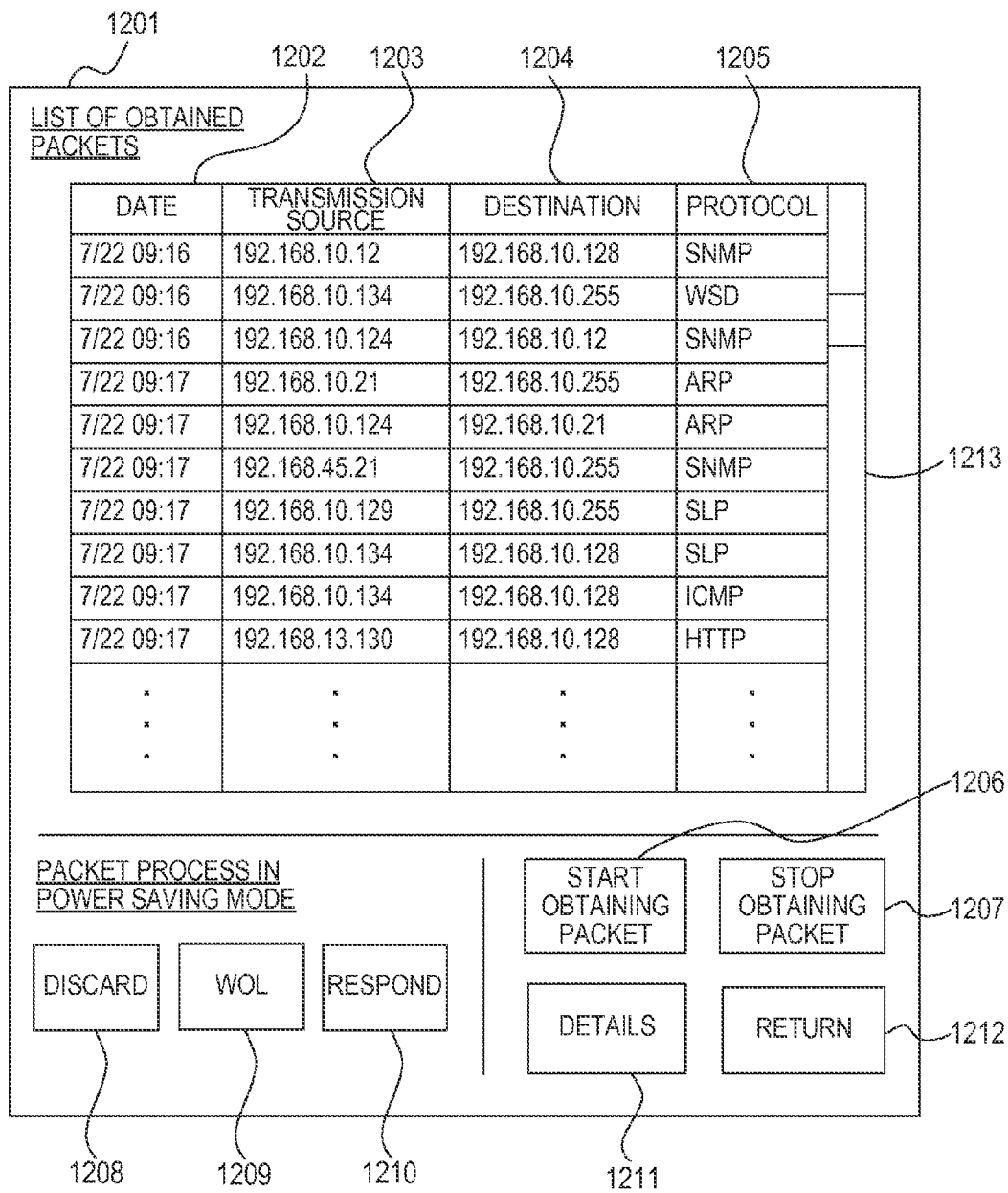
FIG. 12 is a diagram illustrating another example of the user interface.

FIG. 12 is a diagram illustrating an example (a list screen of obtained packets 1201 for displaying a list of packets received by the multifunction machine 101 from the network 103 on the operation unit 240) of a user interface. In the list screen of obtained packets 1201, the obtained packets are displayed in a list format. More specifically, the UI processing unit 308 obtains the packets, which were obtained by the packet sniffer 309, from the HDD 215 and displays the packets on the list screen of obtained packets 1201.

In the list screen of obtained packets 1201, cells of the respective packets can be selected by an operator, and individual processing to the selected packet is performed by depressing a button on the screen. A Date 1202 denotes dates and times when the packet sniffer 309 obtained packets. A transmission source 1203 denotes IP addresses of transmission sources of the packets received by the packet sniffer 309.

A destination 1204 denotes IP addresses of destinations of the packets received by the packet sniffer 309. In a list of the packets to be displayed on the list screen of obtained packets 1201, for example, a packet filtering process is performed by the packet sniffer 309 when the packet sniffer 309 obtains the packets, and packets filtered and narrowed down are displayed. The packet filtering process is such a process of not obtaining all the packets which are flowing on the network 103 but selectively obtaining the packets matching with a specific condition.

An object of obtaining the packet in this case is to perform a registration of the pattern information for the packets received by the multifunction machine 101. Therefore, the packet sniffer 309 does not obtain all the packets which are flowing on the network 103 but obtains the packets to be received by the multifunction machine 101 by using the packet filtering process and makes not to obtain packets other than the above-mentioned packets. As the packets to be received by the multifunction machine 101, for example, a packet of which the destination 1204 is an IP address held by the multifunction machine 101 and a broadcast packet or a multicast packet to be transferred from the transmission source.

A protocol 1205 denotes a protocol (for example, protocol name) of the packet received by the packet sniffer 309. A packet obtaining start button 1206 is a button used for starting to obtain the packets. When the packet obtaining start button 1206 is depressed, the UI processing unit 308 performs a request of starting to obtain packets to the packet sniffer 309. The packet sniffer 309 obtains packets on the network 103 upon receiving the starting request from the UI processing unit 308 while performing the packet filtering process and stores the obtained packets into the HDD 215 at all times. A packet obtaining stop button 1207 is a button used for stopping to obtain the packets. When the packet obtaining stop button 1207 is depressed, the UI processing unit 308 performs a request of stopping to obtain packets to the packet sniffer 309. The packet sniffer 309 terminates to obtain packets upon receiving the stopping request from the UI processing unit 308 and notifies the termination to the UI processing unit 308.

The UI processing unit 308 obtains the packets, which the packet sniffer 309 stored into the HDD 215, upon receiving a termination notification from the packet sniffer 309 and displays the obtained packets as a list on the list screen of obtained packets 1201. In addition, the UI processing unit 308 performs a selection request of a packet, which becomes a main cause of returning from the power saving mode, to the pattern generation unit 306 together with the packets held in the RAM 214.

When the selection request is received, the pattern generation unit 306 selects a packet which becomes a main cause of returning from the power saving mode on the basis of the received packets and the pattern list which is currently managed and notifies the selected result (for example, information which can identify packets) to the UI processing unit 308. The UI processing unit 308 performs a color inversion process (color inversion display) to the notified packet among the packets displayed on the list screen of obtained packets 1201. Herewith, it become possible to specify the packet which returns from the power saving mode and display the specified packet simply for an operator in a pattern matching process using the pattern information which is currently registered.

Here, the pattern generation unit 306 receives pattern setting values from a processing unit such as the SNMP processing unit 310 or the like and generates a pattern list. For example, the SNMP processing unit 310 automatically generates a pattern setting value, which aimed to return from the power saving mode, in accordance with previously determined information when the multifunction machine 101 is activated and transmits the generated pattern setting value to the pattern generation unit 306. Therefore, the pattern generation unit 306 can select a packet which becomes a main cause of returning from the power saving mode among the transferred packets by using the pattern list currently managed.

A discard button 1208 is a button used for discarding the packet of selected type in a case that the network controller 230 received the packet of which type is selected by an operator on the list screen of obtained packets 1201. As to an operation in a case that the discard button 1208 was depressed, it will be described by exemplifying an SNMP packet 1213. When the SNMP packet 1213 is selected by an operator and the discard button 1208 is depressed, the UI processing unit 308 transmits the selected SNMP packet 1213 to the SNMP processing unit 310 by treating it as a packet discard pattern registration request. The SNMP processing unit 310 receives the packet discard pattern registration request and generates the pattern setting values as described in FIG. 7.

Here, as described with reference to FIG. 4, information of a region necessary for registering the pattern information is previously determined every the network protocol, and information of the necessary region is to be targeted for a pattern matching process. Therefore, the SNMP processing unit 310 can generate a pattern setting value used for discarding the packet by using the information of the region necessary for registering the pattern information from the packets received from the UI processing unit 308.

The SNMP processing unit 310 transmits the generated pattern setting value to the pattern generation unit 306. The pattern generation unit 306 performs a process by using the pattern setting value transferred from the SNMP processing unit 310 in accordance with a flow chart indicated in FIG. 8.

A WOL (Wake on LAN) button 1209 is a button used for setting to return from the power saving mode in a case that the network controller 230 received the packet of which the type is selected by an operator on the list screen of obtained packets 1201. As to an operation in a case that the WOL button 1209 was depressed, it will be described by exemplifying the SNMP packet 1213.

When the SNMP packet 1213 is selected by an operator and the WOL button 1209 is depressed, the UI processing unit 308 transmits the selected SNMP packet 1213 to the SNMP processing unit 310 by treating it as a normal power mode returning pattern registration request. The SNMP processing unit 310 receives the normal power mode returning pattern registration request and generates the pattern setting values as described in FIG. 7.

Here, as described with reference to FIG. 4, information of a region necessary for registering the pattern information is previously determined every the network protocol, and information of the necessary region is to be targeted for a pattern matching process. Therefore, the SNMP processing unit 310 can generate a pattern setting value used for returning from the power saving mode by using the information of the region necessary for registering the pattern information from the packets received from the UI processing unit 308.

The SNMP processing unit 310 transmits the generated pattern setting value to the pattern generation unit 306. The pattern generation unit 306 performs a process by using the pattern setting value transferred from the SNMP processing unit 310 in accordance with a flow chart indicated in FIG. 8.

A response button 1210 is a button used for performing a substitute response without returning from the power saving mode in a case that the network controller 230 received the packet of which the type is selected by an operator on the list screen of obtained packets 1201. As to an operation in a case that the response button 1210 was depressed, it will be described by exemplifying the SNMP packet 1213.

When the SNMP packet 1213 is selected by an operator and the response button 1210 is depressed, the UI processing unit 308 transmits the selected SNMP packet 1213 to the SNMP processing unit 310 by treating it as a substitute response pattern registration request. The SNMP processing unit 310 receives the substitute response pattern registration request and generates the pattern setting values as described in FIG. 7.

Here, as described with reference to FIG. 4, information of a region necessary for registering the pattern information is previously determined every the network protocol, and information of the necessary region is to be targeted for a pattern matching process. Therefore, the SNMP processing unit 310 can generate a pattern setting value used for performing the substitute response by using the information of the region necessary for registering the pattern information from the packets received from the UI processing unit 308.

The SNMP processing unit 310 transmits the generated pattern setting value to the pattern generation unit 306. The pattern generation unit 306 performs a process by using the pattern setting value transferred from the SNMP processing unit 310 in accordance with a flow chart indicated in FIG. 8.

A details button 1211 is a button used for displaying a screen (refer to FIG. 13) which displays the details of the packet selected by an operator on the list screen of obtained packets 1201. When the details button 1211 is depressed for the selected packet on the list screen of obtained packets 1201, the UI processing unit 308 displays the details of actual data of the packet, which is selected, on the operation unit 240.

A return button 1212 is a button used for terminating the list screen of obtained packets 1201. When the return button 1212 is depressed, the UI processing unit 308 terminates the list screen of obtained packets 1201 on the operation unit 240 and discards data of the packet which was obtained from the HDD 215 and held.

FIG. 13 is a diagram illustrating an example (a packet details display screen 1301 to be displayed when the details button 1211 is depressed) of a user interface. When the details button 1211 is depressed for the packet which was selected on the list screen of obtained packets 1201, the UI processing unit 308 displays details of actual data of the packet, which is selected, on the operation unit 240 with a state of classifying the contents every field of each of frames in the packet.

A return button 1302 is a button used for terminating the packet details display screen 1301. When the return button 1302 is depressed, the UI processing unit 308 terminates the packet details display screen 1301 on the operation unit 240 and displays the list screen of obtained packets 1201.

By providing the user interface as mentioned above to an operator, a packet which becomes a main cause of returning from the power saving mode can be specified to a packet which is flowing every network environment, where the multifunction machine 101 is located, of a customer. In addition, a packet of main cause of the returning is specified to an operator and a mechanism capable of registering such pattern information which can maintain the power saving mode for a longer period is provided to an operator.

According to the above-mentioned constitution, an operator of apparatus becomes to be able to register the pattern information after actually recognizing that what kind of the contents is held in the packet flowing on the network 103. In addition, even if the operator of apparatus does not set or edit detailed data of the packet flowing on the network, pattern information such as a substitute response, a wakeup or the like becomes to be able to register or change in accordance with a network environment every customer.

In this manner, the returning to an unnecessary normal power mode at a time of the power saving mode can be suitably and simply avoided, and, as a result, it becomes possible to maintain the power saving mode for a longer period.

Incidentally, the present embodiment is not limited to the above-mentioned constitution. For example, in the list screen of obtained packets 1201, although an example of displaying the obtained packets in time series has been enumerated, it may be constituted that the obtained packets are displayed in statistical order (large amount order or the like). According to this constitution, an operator of apparatus can simply set packets, which are frequently received, to use a substitute response.

Other Embodiments

It should be noted that the embodiments of the present invention are not limited to those described above. More specifically, the constitutions of the first and second embodiments may be properly combined.

Moreover, the present invention can also be achieved by a process that software (programs) for achieving the functions of the above embodiments is supplied to a system or apparatus through a network or various storage media and the supplied programs are read and executed by a computer (a CPU (central processing unit), an MPU (micro processing unit) or the like) of the system or apparatus.

Incidentally, it should be noted that the above main controller 210 serves as a first information processing apparatus (an example of a first computer) and the above network controller 230 serves as a second information processing apparatus (an example of a second computer).

According to the above embodiments, it is possible to easily maintain the state of less power consumption.

While the present invention has been described with reference to what are presently considered to be the preferred embodiments, it is to be understood that the invention is not limited to the disclosed embodiments. On the contrary, the invention is intended to cover various modifications and equivalent arrangements included within the spirit and scope of the appended claims.

The embodiments of the present invention can also be realized by a computer of a system or apparatus that reads out and executes computer executable instructions recorded on a storage medium (e.g., non-transitory computer-readable storage medium) to perform the functions of one or more of the above embodiments of the present invention, and by a method performed by the computer of the system or apparatus by, for example, reading out and executing the computer executable instructions from the storage medium to perform the functions of one or more of the above embodiments. The computer may comprise one or more of a CPU, an MPU, or other circuitry, and may include a network of separate computers or separate computer processors. The computer executable instructions may be provided to the computer, for example, from a network or the storage medium. The storage medium may include, for example, one or more of a hard disk, a RAM (random-access memory), a ROM (read only memory), a storage of distributed computing systems, an optical disk (such as a CD (compact disc), a DVD (digital versatile disc), or a Blu-ray Disc (BD)™), a flash memory device, a memory card, and the like.

While the present invention has been described with reference to the exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2012-144548, filed Jun. 27, 2012, which is hereby incorporated by reference herein in its entirety.

What is claimed is:

1. A data processing apparatus which can operate in a power saving mode in which power consumption is smaller than that of a normal power mode, the apparatus comprising:
   one or more processors; and
   one or more memories storing instructions that, when executed by the one or more processors, cause the one or more processors to:
   store, in the one or more memories, a response pattern indicating one or more packets the data processing apparatus can respond to while maintaining the power saving mode, a return pattern indicating one or more packets for returning the data processing apparatus from the power saving mode to the normal power mode, and a discard pattern indicating one or more packets that the data processing apparatus discards;
   when a packet corresponding to the response pattern stored in the one or more memories is received by the data processing apparatus operating in the power saving mode, respond to the received packet while maintaining the power saving mode;
   when a packet corresponding to the return pattern stored in the one or more memories is received by the data processing apparatus operating in the power saving mode, return the data processing apparatus from the power saving mode to the normal power mode;
   when a packet corresponding to the discard pattern stored in the one or more memories is received by the data processing apparatus operating in the power saving mode, discard the received packet while maintaining the power saving mode;
   cause a packet information screen showing the packet received by the data processing apparatus to be displayed; and
   register a packet in the one or more memories as any of the response pattern, the return pattern, or the discard pattern after the packet is selected by a user from the packet information screen.

2. The data processing apparatus according to claim 1, wherein at least a packet reception date and hour and a packet transmission source address are displayed on the packet information screen.

3. The data processing apparatus according to claim 1, wherein, on the packet information screen, a first object for registering the packet selected by the user in the one or more memories as the response pattern and a second object for registering the packet selected by the user in the one or more memories as the return pattern are displayed.

4. The data processing apparatus according to claim 1, wherein, on the packet information screen, a first object for registering the packet selected by the user in the one or more memories as the response pattern, a second object for registering the packet selected by the user in the one or more memories as the return pattern, and a third object for registering the packet selected by the user in the one or more memories as the discard pattern are displayed.

5. The data processing apparatus according to claim 1, wherein the instructions, when executed by the one or more processors, further cause the one or more processors to:
   obtain a packet,
   wherein obtaining the packet starts in response to reception of an obtaining start instruction from the user, and obtaining the packet stops in response to reception of an obtaining stop instruction from the user; and
   cause the packet obtained by the sniffer unit to be displayed on the packet information screen.

6. The data processing apparatus according to claim 1, wherein the data processing apparatus further includes a printing apparatus.

7. A control method of a data processing apparatus which can operate in a power saving mode of which power consumption is smaller than that of a normal power mode, the method comprising:
   storing, in a memory, a response pattern indicating one or more packets the data processing apparatus can respond to while maintaining the power saving mode, a return pattern indicating one or more packets for returning the data processing apparatus from the power saving mode to the normal power mode, and a discard pattern indicating one or more packets that the data processing apparatus discards;
   when a packet corresponding to the response pattern stored in the memory is received by the data processing apparatus operating in the power saving mode, responding to the received packet while maintaining the power saving mode;
   when a packet corresponding to the return pattern stored in the memory is received by the data processing apparatus operating in the power saving mode, returning the data processing apparatus from the power saving mode to the normal power mode;
   when a packet corresponding to the discard pattern stored in the memory is received by the data processing apparatus operating in the power saving mode, discarding the received packet while maintaining the power saving mode;
   causing a packet information screen showing the packet received by the data processing apparatus to be displayed; and
   registering a packet in the memory as any of the response pattern, the return pattern, or the discard pattern after the packet is selected by a user from the packet information screen.

8. A non-transitory computer-readable storage medium storing a computer-executable program that, when executed by a processor, causes the processor to implement a control method of a data processing apparatus which can operate in a power saving mode of which power consumption is smaller than that of a normal power mode, the control method comprising:
   storing, in a memory, a response pattern indicating one or more packets the data processing apparatus can respond to while maintaining the power saving mode, a return pattern indicating one or more packets for returning the data processing apparatus from the power saving mode to the normal power mode, and a discard pattern indicating one or more packets that the data processing apparatus discards;
   when a packet corresponding to the response pattern stored in the memory is received by the data processing apparatus operating in the power saving mode, responding to the received packet while maintaining the power saving mode;

when a packet corresponding to the return pattern stored in the memory is received by the data processing apparatus operating in the power saving mode, returning the data processing apparatus from the power saving mode to the normal power mode;

when a packet corresponding to the discard pattern stored in the memory is received by the data processing apparatus operating in the power saving mode, discarding the received packet while maintaining the power saving mode;

causing a packet information screen showing the packet received by the data processing apparatus to be displayed; and registering a packet in the memory as any of the response pattern, the return pattern, or the discard pattern after the packet is selected by a user from the packet information screen.

\* \* \* \* \*